United States Patent [19]

Swiatosz et al.

[11] Patent Number: 4,539,986
[45] Date of Patent: Sep. 10, 1985

[54] SIMULATED OXYGEN BREATHING APPARATUS

[75] Inventors: Edmund Swiatosz, Maitland; Paul D. Grimmer, Winter Park; Rocco M. Sciascia, Altamonte Springs, all of Fla.

[73] Assignee: The United States of America as represented by the Secretary of the Navy, Washington, D.C.

[21] Appl. No.: 417,815

[22] Filed: Sep. 13, 1982

[51] Int. Cl.³ .............................................. A62B 7/02
[52] U.S. Cl. ......................... 128/205.13; 128/205.22; 128/205.24; 128/205.25; 128/200.24
[58] Field of Search ...................... 128/205.12, 205.29, 128/206.15, 205.25, 201.25, 202.26, 205.13, 205.23, 201.11, 205.24, 205.28, 204.28, 205.17, 205.15, 203.28, 202.27, 205.22, 206.16, 204.15

[56] References Cited

U.S. PATENT DOCUMENTS

| | | |
|---|---|---|
| 2,710,003 | 6/1955 | Hamilton et al. ............... 128/202.26 |
| 3,390,676 | 7/1968 | Warncke et al. ............... 128/204.28 |
| 3,483,887 | 12/1969 | Warncke et al. ............... 128/204.28 |
| 4,163,448 | 8/1979 | Grouard ......................... 128/205.12 |
| 4,265,238 | 5/1981 | Swiatosz et al. ............... 128/205.12 |

FOREIGN PATENT DOCUMENTS

| 599077 | 6/1934 | Fed. Rep. of Germany ......................... 128/205.12 |
|---|---|---|
| 368866 | 2/1973 | U.S.S.R. ......................... 128/205.29 |

Primary Examiner—Henry J. Recla
Assistant Examiner—Karin M. Reichle
Attorney, Agent, or Firm—Robert F. Beers; Robert W. Adams

[57] ABSTRACT

A training device simulating a personal breathing apparatus utilizes high pressure air canisters mounted within the breathing bags of a modified operational breathing apparatus. Air is supplied to the trainee through a plurality of regulators and valves via an air passage opened by a mechanical actuation linkage, which simulates the actual actuation device and technique.

3 Claims, 3 Drawing Figures

SIMULATED OXYGEN BREATHING APPARATUS

BACKGROUND OF THE INVENTION

1. Field of the Invention

The present invention relates to firefighter training in general and in particular to the safety equipment used in firefighter training. More particularly, the present invention relates to the breathing apparatus used by firefighters in their training. In even greater particularity, the present invention may be described as a training device replacement for an oxygen breathing apparatus in firefighter training.

2. Description of the Prior Art

Historically the Navy has conducted firefighter training using the standard oxygen breathing apparatus (OBA) manufactured by the Mine Safety Appliance Company. This device is standard equipment on board all naval ships and stations. It is a breathing bag/face mask type device utilizing an expendable canister of chemical reagents to generate oxygen for the user to breathe. The expendable canisters are both costly and potentially caustic. The canisters provide oxygen for up to one hour continuously after activation. Current and projected Navy firefighting training calls for simulated fire engagements of up to twenty minutes duration, during which a supplemental breathing apparatus will be needed. The inventors of the present device have been engaged in developing training devices to replace the standard OBA in the training environment with more cost efficient or safer equipment. In addition to the present invention, this effort has resulted in the training device disclosed in U.S. Pat. No. 4,265,238 and U.S. Pat. No. 4,471,774 which show filtration devices and combination filtration storage devices.

SUMMARY OF THE INVENTION

In accordance with the goal of replacing the costly OBA in the training environment while retaining trainee familiarity with the operation device, the present invention utilizes the basic structure of the OBA, retaining the face mask, flexible tubing, and breathing bag. The breathing bag of the OBA is retained in structure, it being an integrated bag having bilateral chambers and herein configured to receive exhaled air from the face mask via the flexible tubing. The reagent canister is replaced by a dummy canister housing an actuation linkage. Air is supplied by two rechargable storage bottles mounted within the breathing bag, and a system of regulators and valves which prevent the trainee from using the device except in accordance with procedures for using the operational OBA.

It is an object of the present invention to provide a cost efficient training device to replace the standard OBA in the training environment. Yet another object is to provide a low cost training device which will permit firefighting training while training the firefighter to use the operational equipment.

These and further objects, features, and advantages of the invention will become apparent from the following description taken in conjunction with the appended drawings.

DESCRIPTION OF THE PREFERRED EMBODIMENT

The current invention retains the physical profile of the firefighter breathing apparatus, the OBA, currently in use in the operational environment, while modifying the manner of operation to achieve greater cost economy and to reduce the hazards inherent in the reagent canister for the training environment. The result is a relatively safe and economical training device which gives the trainee a sense of familiarity with the operational device.

Figure 1:
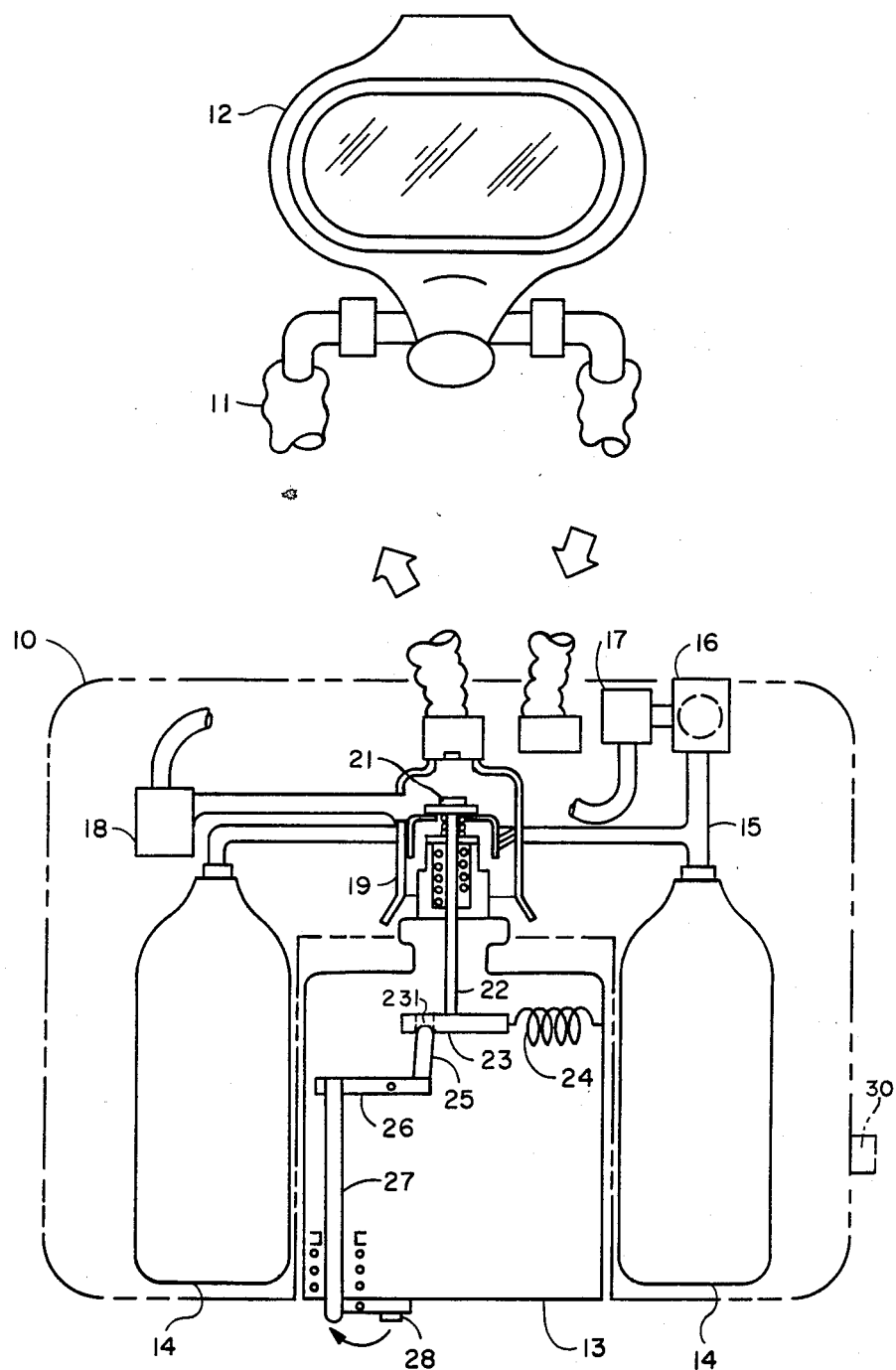
FIG. 1 is a simplified schematic of the apparatus.

Referring to FIG. 1, note that breathing bag 10, flexible tubing 11, and face mask 12 have been retained from the operational OBA. The reagent canister of the operational OBA has been replaced by a dummy cannister 13 which will be discussed hereinafter. Inasmuch as the reagent canister supplied the oxygen to the trainee in the operational OBA, a source of oxygen is required in the present invention. Unlike the expendable reagent canister, however, the source needs to be reusable as several hundred trainees are expected to use the same equipment over an extended period of time. In view of this requirement, storage bottles 14 were placed inside breathing bag 10. Because of the limited space available, storage bottles 14 must be charged to a relatively high pressure of 4500 psi or greater. Bottles of a usable size and sufficient strength are commercially available. Storage bottles acceptable for use in the invention are those such as Luxifor Model L-13W. These bottles, when charged to 4500 psi, provide breathable air for twenty minutes. The preferred storage bottles are fiberglass wound, seamless aluminum.

Stainless steel fittings, not shown, are used to connect storage bottles 14 to a tubing 15 through which the high pressure air passes. Tubing 15 connects both storage bottles 14 to a manual valve 16. Manual valve 16 is located such that it can isolate storage bottles 14 from the rest of the device. Valve 16 will allow storage bottles 14 to be recharged while isolated and permits storage of the device while charged, with the high pressure gas limited to the area of storage bottles 14. For normal operation valve 16 must, obviously, be open.

Air from valve 16 is fed into a first stage regulator 17 which reduces the gas pressure from 4500 psi to approximately 100 psi. A suitable regulator for this purpose is a device manufactured by Robertshaw Controls, Part No. 904-304-308. A demand type regulator 18 has its supply side connected to first stage regulator 17 and its demand side connected to a modified OBA fitting 19. A suitable demand type regulator is a Robertshaw Part No. 904-003-363. Fitting 19 is connected to flexible tubing 11 to provide air to the user. Since regulator 18 is a demand regulator, air is supplied via fitting 19 and tubing 11 only on breathing demand from the user.

However, note that a poppet disc 21 effectively seals flexible tubing 11, thus preventing the flow of air to the user, when dummy canister 13 is inserted into the training device. Disc 21 is held by poppet rod 22 and slide 23 until dummy canister 13 is actuated by the user.

Exhaled air from mask 12 flows through the other side of tubing 11 and is exhausted into breathing bags 10. The trainees breathing would inflate bags 10. The bags include pressure release valve 30 that is normally closed.

Figure 2:
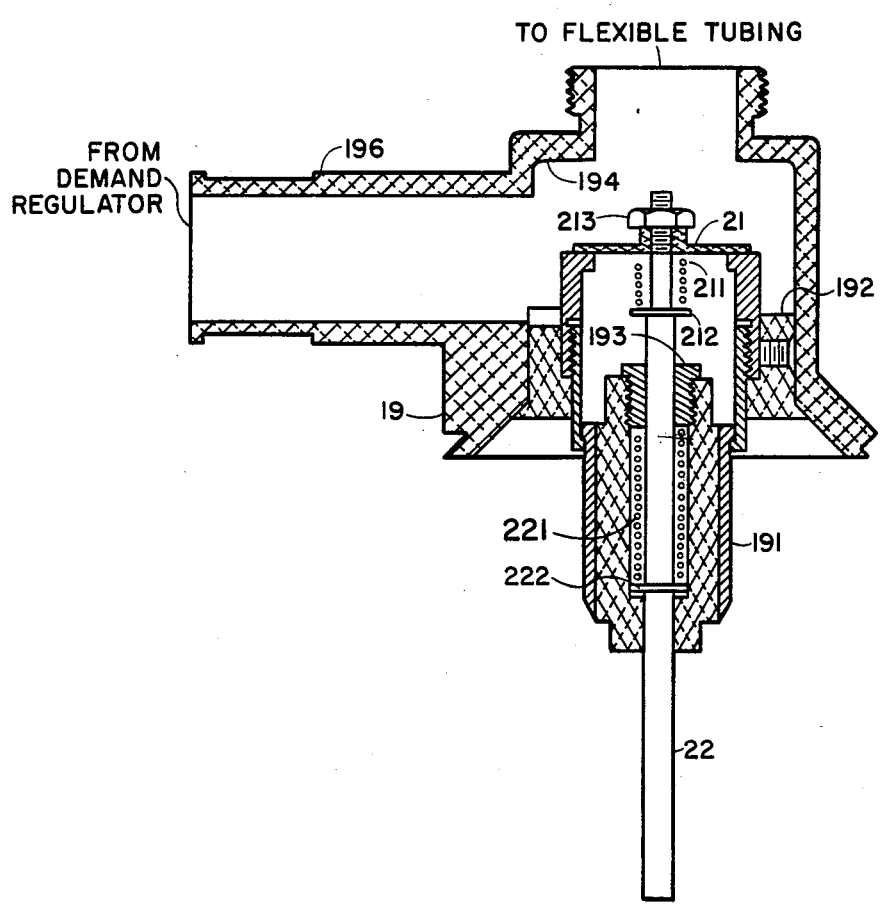
FIG. 2 is a cutaway view of the poppet valve mechanism.

Referring to FIG. 2, it can be seen that fitting 19 has been modified to receive air from the demand regulator via extension 196. Disc 21 is held on poppet rod 22 by a retaining nut 213. Disc 21 seats against shoulder 194 to close off the air passage to the user. In order to avoid tolerancing problems, disc 21 may be urged against shoulder 194 by a poppet disc tolerancing spring 211 which is mounted about poppet rod 22 and held in place by a retaining washer 212 affixed to rod 22.

Poppet rod 22 is slidably mounted within a fitting core 191 centered within fitting 19 by spacers 192. A poppet rod compression spring 221 mounted about rod 22 within core 191 provides biasing to urge rod 22 downward. Bushing 193 and retaining washer 222 provide compression surfaces for spring 221 to work against.

Figure 3:
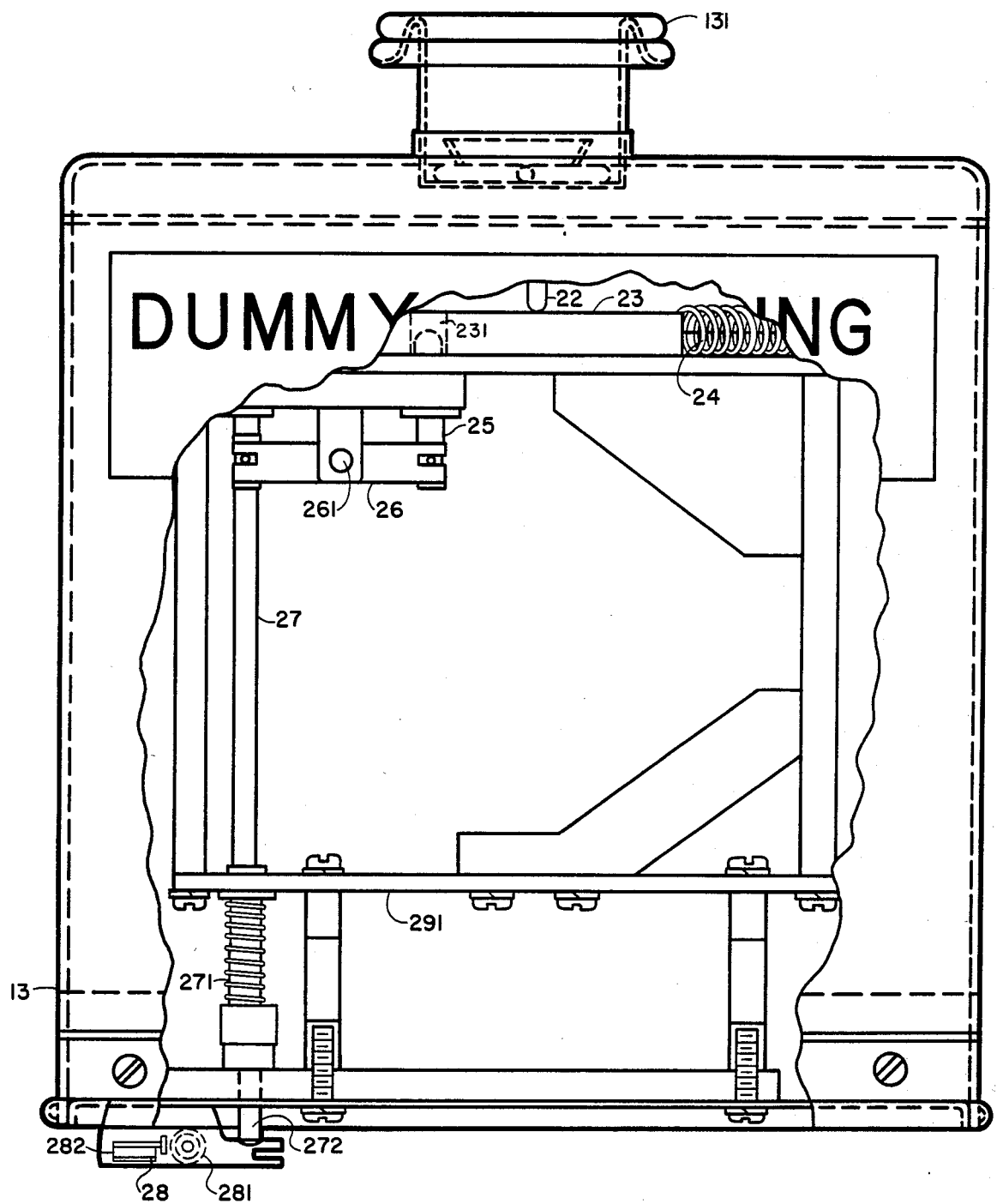
FIG. 3 is a cutaway view of the actuating mechanism within the dummy canister.

Referring to FIGS. 1 and 3, poppet rod 22 extends down through a neck 131 when canister 13 is inserted into the training device and abuts slide 23. Slide 23 and the remainder of the actuating linkage are mounted on an actuator frame 291 which is mounted within canister 13. The insertion of canister 13 seats poppet disc 21 against shoulder 194 and compresses spring 221. Slide 23 is connected to a spring 24 which exerts a force on slide 23 which would move the slide laterally. Such lateral motion would place poppet rod 22 in cooperative relationship with an aperture 231.

In the unactuated mode, a trigger 25 engages aperture 231 and holds aperture 231 in an off-center position, thereby extending spring 24 and positioning slide 23 to abut poppet rod 22.

Trigger 25 engages or disengages aperture 231 according to the force exerted on trigger 25 by a cross link 26 which is pivotally mounted 261 to frame 291. Cross link 26 in turn is positioned by the motion of a pushrod 27 extending vertically within canister 13 and frame 291. A downward bias is exerted on pushrod 27 by a pushrod biasing spring 271, causing a pushrod extension 272 to protrude slightly from the bottom of canister 13.

A spring loaded hammer 28, spring 281, and cover are mounted to the bottom of canister 13 in the same manner as they are on the operational equipment. Hammer 28 is positioned to strike pushrod extension 272 when cover 282 is removed to actuate the device.

When the device is actuated, the linkage shown in FIG. 3 causes trigger 25 to disengage aperture 231, whereupon slide spring 24 moves aperture 231 into cooperative relation with poppet rod 22. The closure means of FIG. 2 is opened by the motion of poppet rod 22 through aperture 231 due to the biasing force of spring 221, thereby providing an open air passage between the user and demand regulator 18. Just as in the operational OBA, the flow of air will not stop until canister 13 is removed, thus the trainee is apprised of the limited air supply available. Unlike the operational canister, which becomes extremely hot and presents a hazard in and of itself, dummy canister 13 can be removed without endangering the trainee, if needed, for example to correct the trainee's procedure in using the equipment.

While the invention has been described with reference to a preferred embodiment, it will be appreciated by those skilled in the art that additions, deletions, modifications, and substitutions or other changes not specified may be made which will fall within the purview of the appended claims.

What is claimed is:

1. A modified personal breathing apparatus for training use having a breathing bag, a face mask, flexible tubing connecting said face mask and breathing bag such that air is exhaled into said breathing bag, and a canister designed for cooperative insertion into said apparatus in fixed relation thereto, wherein the improvement comprises:
    means within said breathing bag for storing high pressure air including two cylinders containing said high pressure air, each cylinder having an outlet;
    means for reducing said pressure of said air to a breathable level including a plurality of regulators connected in series, each having an input and an output, and that together have an inlet and an outlet, with the input of the first regulator in said seves defining said inlet, the output of the first regulator connected to the input of the second regulator, and the output of the second regulator in said series defining said outlet of said plurality of regulators, and a tubular conduit means connected to the outlet of each said cylinder and downstream therefrom to the inlet of said plurality of regulators for providing a single air passage to said plurality of regulators that is common to both said cylinders;
    selectively removable closure means operably connected at the outlet of said plurality of regulators for obstructing the flow of air therefrom;
    flexible tubing connected at one end thereof to said closure means and at the opposite end thereof to said face mask, operably providing a passageway for air from said closure means to said face mask; and
    actuating means within said canister removably connected to said closure means for selectively removing the closure means from between the flexible tubing and the reducing means, permitting the flow of air between said reducing means and said flexible tubing.

2. The breathing apparatus of claim 1, wherein said reducing means further comprises valve means connected between said cylinders and said regulators for opening and closing said air passage therebetween.

3. The breathing apparatus of claim 2, wherein
    said first regulator comprises a first stage regulator for reducing said high pressure air from approximately 4500 psi to approximately 100 psi, the input of said first regulator being connected to said valve means;
    said second regulator comprises a second stage demand-type regulator for reducing said 100 psi air to atmospheric pressure, said output of said second regulator being connected to said closure means; and
    second conduit means for connecting the output of said first regulator and the input of said demand regulator for passing air therebetween.

* * * * *